(12) United States Patent
Hoffman

(10) Patent No.: US 7,935,933 B2
(45) Date of Patent: May 3, 2011

(54) DETECTOR FOR AN X-RAY IMAGING SYSTEM

(75) Inventor: David Michael Hoffman, New Berlin, WI (US)

(73) Assignee: General Electric Company, Schenectady, NY (US)

( * ) Notice: Subject to any disclaimer, the term of this patent is extended or adjusted under 35 U.S.C. 154(b) by 134 days.

(21) Appl. No.: 11/343,786

(22) Filed: Jan. 30, 2006

(65) Prior Publication Data

US 2007/0176111 A1    Aug. 2, 2007

(51) Int. Cl.
*G01T 1/20*    (2006.01)
(52) U.S. Cl. .................................................. 250/370.11
(58) Field of Classification Search ............... 250/370.11
See application file for complete search history.

(56) References Cited

U.S. PATENT DOCUMENTS

| | | | |
|---|---|---|---|
| 5,973,311 A * | 10/1999 | Sauer et al. | ................ 250/208.1 |
| 6,198,791 B1 | 3/2001 | He et al. | |
| 6,445,763 B1 | 9/2002 | Hoffman | |
| 6,700,948 B2 | 3/2004 | Hoffman | |
| 6,717,150 B2 | 4/2004 | Hoffman | |
| 6,762,473 B1 | 7/2004 | Goushcha et al. | |
| 2002/0067796 A1* | 6/2002 | Hoffman | ........................ 378/19 |
| 2007/0158573 A1* | 7/2007 | Deych | ...................... 250/370.11 |

* cited by examiner

*Primary Examiner* — David P Porta
*Assistant Examiner* — Carolyn Igyarto
(74) *Attorney, Agent, or Firm* — Armstrong Teasdale LLP

(57) ABSTRACT

A detector is provided for an x-ray imaging system. The detector includes a photosensitive region with an area less than half of an area of a scintillator cell, from which the photosensitive region receives light.

20 Claims, 7 Drawing Sheets

DETECTOR FOR AN X-RAY IMAGING SYSTEM

BACKGROUND OF THE INVENTION

This invention relates generally to medical imaging systems, and more particularly, to a detector for an x-ray imaging system.

A computed tomography (CT) imaging system includes an x-ray source that generates x-rays. These x-rays are passed through a patient's body. The x-rays, after passing through the body of the patient, are absorbed by one or more x-ray detector modules. An x-ray detector module detects the x-rays and generates electrical signals corresponding to the intensity of the x-rays. The electrical signals generated by the x-ray detector module are fed into a Data Acquisition System (DAS), which combines the electrical signals and converts them from an analog to a digital form. The data generated by the DAS is then transmitted to an image reconstructor, which creates and displays an image of the patient's anatomy.

Each x-ray detector module includes a multi-cell array of detector elements. Each detector element includes a scintillator cell and a photodiode. The scintillator cell absorbs the x-rays generated by the x-ray source and emits visible light proportionate to the intensity of x-rays absorbed. The detector elements used in CT systems generate a high amount of noise. The high amount of noise affects a quality of the image produced by the CT system.

BRIEF DESCRIPTION OF THE INVENTION

In an exemplary embodiment of the invention, a detector is provided. The detector includes a photosensitive region with an area less than half of the area of a scintillator cell from which the photosensitive region receives light.

In another exemplary embodiment of the invention, an x-ray imaging system is provided. The x-ray imaging system includes an x-ray source configured to generate x-rays. Further, the x-ray imaging system includes an x-ray detector module configured to detect the x-rays. The x-ray detector module includes a photosensitive region with an area less than half of the area of a scintillator cell from which the photosensitive region receives light.

DETAILED DESCRIPTION OF THE INVENTION

Various embodiments of the invention provide a detector for an x-ray imaging system. Specifically, various embodiments of the invention provide a detector including a photosensitive region with an area less than half of the area of a scintillator cell from which the photosensitive region receives light.

Figure 1:
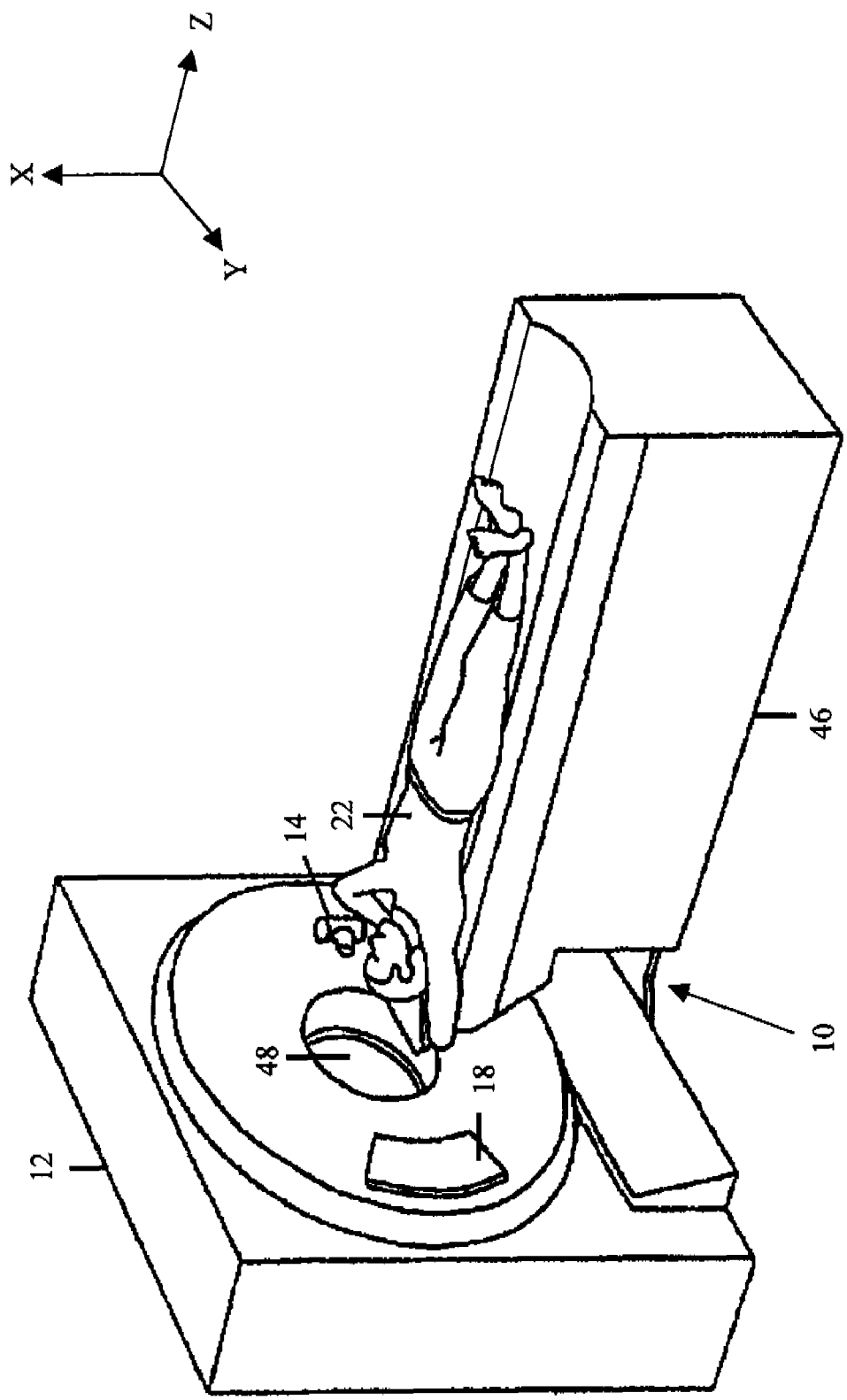
FIG. 1 is an isometric view of an embodiment of a computed tomography system.
Figure 2:
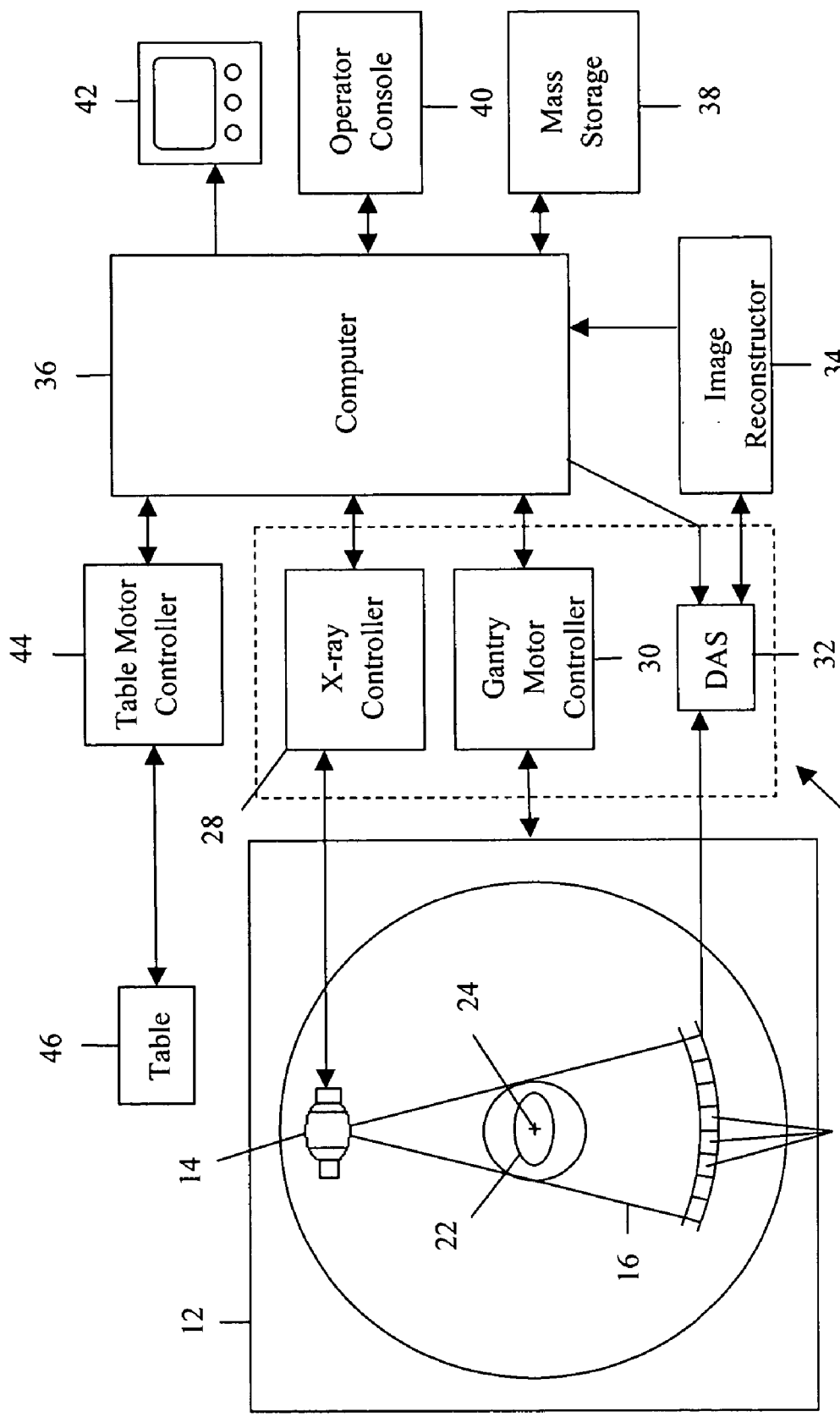
FIG. 2 is a block diagram of the computed tomography system of FIG. 1.

Referring to FIGS. 1 and 2, a computed tomography (CT) imaging system 10 is shown as including a gantry 12 representative of a "third generation" CT scanner. Gantry 12 has an x-ray source 14 that projects a beam of x-rays 16 toward a detector array 18 on the opposite side of gantry 12. The center of gantry 12 is on an isocenter. As an example, detector array 18 has an actual width of 32 millimeters (mm). The actual width of 32 mm may translate to a width of 20 mm at the isocenter of gantry 12. As another example, detector array 18 has an actual width of 64 mm.

The x-rays generated by x-ray source 14 travel along a y-axis, the y-axis being a radial axis extending from the isocenter of gantry 12 towards the focal spot of x-ray source 14.

In various embodiments of the invention, the beams of x-rays generated by x-ray source 14 are collimated by a collimator. The collimated x-ray beams generated by x-ray source 14 are shaped like a fan. The collimated x-ray beams then pass through a subject 22, such as a medical patient, located along a z-axis.

Detector array 18 includes a plurality of detector elements 20 which together sense the projected x-rays that pass through subject 22. Each detector element 20 produces an electrical signal that represents an intensity of an impinging x-ray beam and hence the attenuation of the beam as it passes through subject 22. During a scan to acquire x-ray projection data, gantry 12 and a plurality of components mounted thereon rotate about a center of rotation 24. Detector array 18 may be fabricated in a single slice or multi-slice configuration. In a multi-slice configuration, detector array 18 has a plurality of rows of detector elements 20, one of which is shown in FIG. 2.

Rotation of gantry 12 and the operation of x-ray source 14 are governed by a control mechanism 26 of CT system 10. Control mechanism 26 includes an x-ray controller 28 that provides power and timing signals to x-ray source 14 and a gantry motor controller 30 that controls the rotational speed and position of gantry 12. A data acquisition system (DAS) 32 in control mechanism 26 samples analog data from detector elements 20 and converts the analog data to digital signals for subsequent processing. An image reconstructor 34 receives sampled and digitized x-ray data from DAS 32 and performs high speed image reconstruction. The reconstructed image is applied as an input to a computer 36 which stores the image in a mass storage device 38.

Computer 36 also receives commands and scanning parameters from an operator via console 40 that has a keyboard. An associated cathode ray tube display 42 allows the operator to observe the reconstructed image and other data from computer 36. The operator supplied commands and parameters are used by computer 36 to provide control signals and information to DAS 32, x-ray controller 28 and gantry motor controller 30. In addition, computer 36 operates a table motor controller 44 which controls a motorized table 46 to position subject 22 in gantry 12. Particularly, table 46 moves portions of patient 22 through a gantry opening 48.

Although the specific embodiment mentioned above refers to a third generation CT system 10, a fourth generation CT system that has a stationary detector and a rotating x-ray source or a fifth generation CT system that has a stationary detector and a stationary x-ray source may be used instead of the third generation CT imaging system 10. In another alternative embodiment, an x-ray system including an x-ray source and an x-ray detector may be used instead of the CT imaging system 10.

Additionally, although the herein described methods are described in a medical setting, it is contemplated that the benefits of the methods accrue to non-medical imaging systems such as those systems typically employed in an industrial setting or a transportation setting, such as, for example, but not limited to, a baggage scanning system for an airport, other transportation centers, government buildings, office buildings, and the like. The benefits also accrue to micro positron emission tomography (PET) and CT systems which are sized to study lab animals as opposed to humans.

Figure 3:
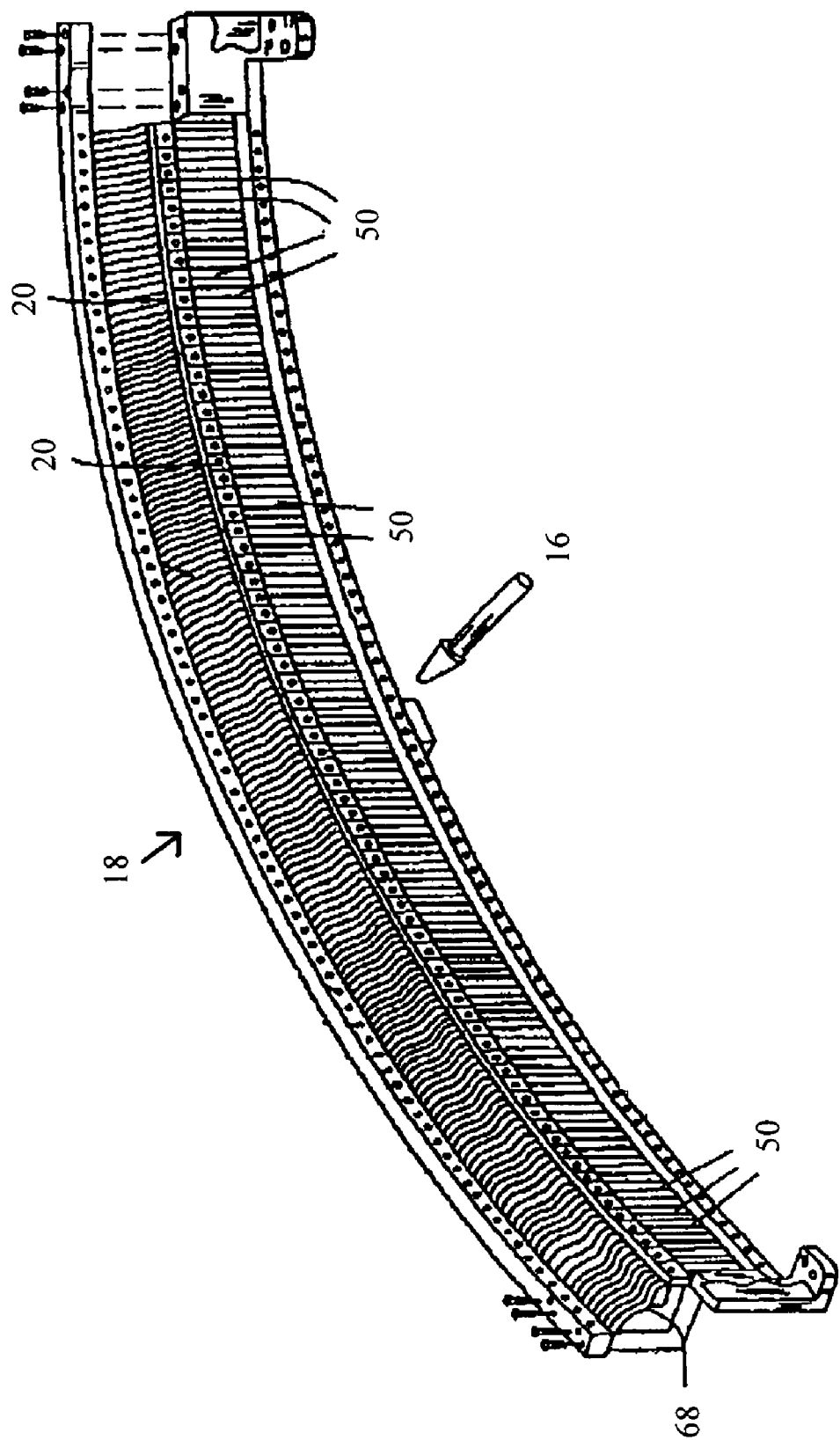
FIG. 3 is an isometric view of an embodiment of a detector array within the computed tomography system.
Figure 4:
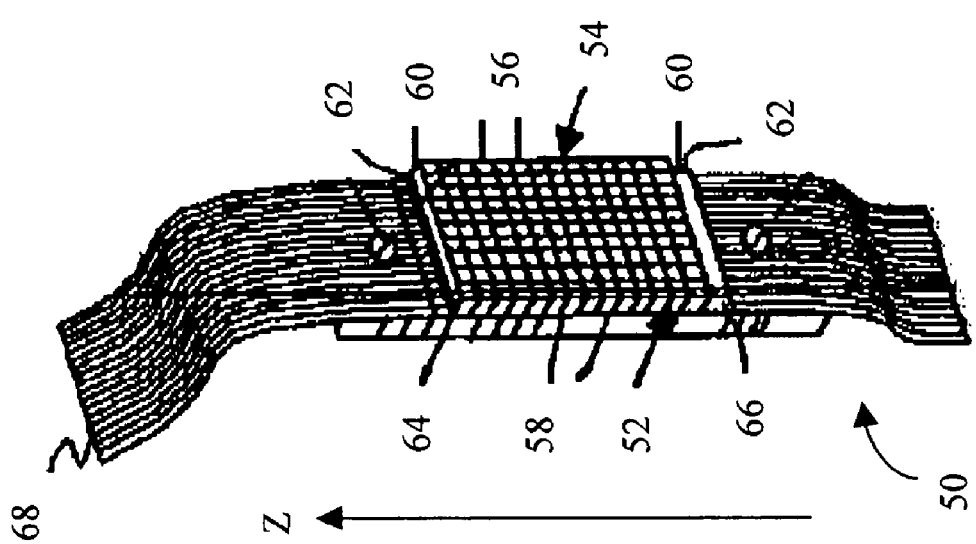
FIG. 4 is an isometric view of an embodiment of a detector module within the detector array.

As shown in FIGS. 3 and 4, detector array 18 includes a plurality of detector modules 50 and each detector module 50 includes a plurality of detector elements 20. Each detector module 50 includes a photosensor array 52 and a multidimensional scintillator array 54 positioned above photosensor array 52. Particularly, scintillator array 54 includes a plurality of scintillators 56, while photosensor array 52 includes a plurality of photodiodes 58, a switch apparatus 60, and a decoder 62.

Scintillator array 54 is positioned over photodiodes 58. Photodiodes 58 are optically coupled to scintillator array 54 and have electrical output lines for transmitting electrical signals representative of the light output by scintillator array 54. Each photodiode 58 produces a separate low level analog output electrical signal that is a measurement of beam attenuation for scintillator 56 of scintillator array 54. Photodiode output lines (not shown) may, for example, be physically located on one side of detector module 50 or on a plurality of sides of detector module 50. In the embodiment illustrated in FIG. 4, photodiode outputs are located at opposing sides of the photosensor array 52.

In one embodiment, as shown in FIG. 3, detector array 18 includes fifty-seven detector modules 50. Each detector module 50 includes a photosensor array 52 and scintillator array 54 and each detector module 50 having a detector element 20 array size of 16×16. As a result, detector array 18 is segmented into 16 rows and 912 columns (16×57 detector modules) allowing up to 16 simultaneous slices of data to be collected along the z-axis with each rotation of gantry 12, where the z-axis is an axis of rotation of the gantry.

Switch apparatus 60 is a multidimensional semiconductor switch array. Switch apparatus 60 is coupled between photodiodes 58 and DAS 32. Switch apparatus 60, in one embodiment, includes two semiconductor switch arrays 64 and 66. Switch arrays 64 and 66 each include a plurality of field effect transistors (FETs) (not shown) arranged as a multidimensional array. Each FET includes an input electrically connected to one of the respective photodiode output lines, an output, and a control (not shown). FET outputs and controls are connected to lines that are electrically connected to DAS 32 via a flexible electrical cable 68. Particularly, about one-half of the photodiode output lines are electrically connected to each FET input line of switch 64 with the other one-half of photodiode output lines electrically connected to FET input lines of switch 66. Flexible electrical cable 68 is thus electrically coupled to photosensor array 52, and is attached, for example, by wire bonding.

Decoder 62 controls the operation of switch apparatus 60 to enable, disable, or combine photodiode 58 outputs depending upon a desired number of slices and a plurality of slice resolutions, such as slice thicknesses, for each slice. Decoder 62, in one embodiment, is an FET controller as known in the art. Decoder 62 includes a plurality of output and control lines coupled to switch apparatus 60 and DAS 32. Particularly, the decoder outputs are electrically coupled to the switch apparatus control lines to enable switch apparatus 60 to transmit the proper data from the switch apparatus inputs to the switch apparatus outputs. Utilizing decoder 62, specific FETs within switch apparatus 60 are selectively enabled, disabled, or combined so that specific photodiode 58 outputs are electrically connected to CT system DAS 32. Decoder 62 enables switch apparatus 60 so that a selected number of rows of photosensor array 52 are connected to DAS 32, resulting in a selected number of slices of data being electrically connected to DAS 32 for processing. In an alternative embodiment, electrical signals from a selected number of rows of photosensor array 52 is combined by hardwiring or combining wires of the photodiode output lines.

The total number of signal outputs from detector modules 50 is equal to the total number of detector elements 20 along an x-axis in the plurality of detector modules 50, multiplied by the number of slices of the plurality of detector modules 50. In various embodiments of the invention, the signal outputs from the plurality of detector modules 50 are low-noise signals. These low-noise signals are then transmitted to DAS 32. In various embodiments of the invention, a DAS with low-noise characteristics may be used as DAS 32.

In various embodiments of the invention, DAS 32 includes a number of converter cards. Further, each converter card includes a number of DAS chips. Each DAS chip includes a pre-amplifier and an analog-to-digital converter. In an embodiment of the invention, low-noise and low-cost application specific integrated circuit (ASIC) chips may be used as DAS chips.

In various embodiments of the invention, each converter card has T channels or T DAS chips or T electronic circuits or T DAS channels to receive signal outputs from at least one detector module 50. For example, detector module 50 may include 16 detector elements along the x-axis and 32 detector elements along the z-axis. In the example, if 16 slices are generated along the z-axis, the total number of signal outputs from each detector module 50 is equal to 16 detector elements along the x-axis, multiplied by 16 slices, i.e., equal to 256. The number of channels in a converter card may be 256 and each of the channels receive a different one of the 256 signal outputs than remaining of the 256 signal outputs received by the remaining of the 256 channels. Therefore, in the example, one converter card is used for each detector module 50.

In various embodiments of the invention, each converter card has T channels to receive T signal outputs from a plurality of detector elements 20, one channel for each signal output. For example, detector module 50 may include 16 detector elements along the x-axis and 16 detector elements along the z-axis. In the example, if 8 slices are generated along the z-axis, the total number of signal outputs from each detector module 50 is equal to 16 detector elements along the x-axis, multiplied by 8 slices, i.e., equal to 128. The number of channels in a converter card may be 256, out of which 128 channels receive a different one of the 128 signal outputs than remaining of the 128 signal outputs received by the remaining of the 128 channels. Therefore, in the example, one converter card can be used to receive signal outputs from two detector modules 50, where each detector module is a 16×8 detector module having 16 detector elements along the x-axis and 8 detector elements along the z-axis. In the example, a 128 channel converter card may be used instead of a 256 channel converter card to receive signal outputs from the 16×8 detector module or an 8×16 detector module.

As another example, detector module 50 may include 16 detector elements along the x-axis and 16 detector elements along the z-axis. In the example, if 4 slices are generated along the z-axis, the total number of signal outputs from each detector module 50 is equal to 16 detector elements along the x-axis, multiplied by 4 slices, i.e., equal to 64. The number of channels in a converter card may be 256, out of which 64 channels receive a different one of the 64 signal outputs than remaining of the 64 signal outputs received by the remaining of the 64 channels. Therefore, in the example, one converter card can be used to receive signal outputs from four detector modules 50, where each detector module is a 16×4 detector module having 16 detector elements along the x-axis and 4 detector elements along the z-axis. In the example, alternatively, a 64 channel converter card may be used to received signal outputs from the 16×4 detector module or a 4×16 detector module.

Alternatively, one converter card may receive the signal outputs from a plurality of detector modules 50. As an example, a two detector module 50 system may be provided, where each detector module 50 includes 8 detector elements along the x-axis and 16 detector elements along the z-axis. If 16 slices are generated along the z-axis for each detector module 50, the total number of signal outputs from each detector module 50 is equal to 8 detector elements along the x-axis, multiplied by 16 slices, i.e., equal to 128. In the example, the total number of signal outputs from both detector modules 50 is 256 and so, the number of channels in a converter card may be 256. Therefore, in the example, one converter card is used for both detector modules 50.

The number of converter cards for a plurality of detector modules 50 may be calculated by dividing the total number of signal outputs from the plurality of detector modules 50 by the number of channels per converter card. As the number of signal outputs from detector module 50 decreases, the number of converter cards also decrease. The number of signal outputs from detector module 50 decrease as the slice thickness for the detector module 50 increases. As an example, if the detector module 50 is a 16×4 detector module, and each slice along the z-axis is 1 mm thick, the slice thickness along the z-axis for the detector module becomes 2 by combining two rows along the z-axis. In the example, the number of signal outputs from the two rows decrease from 16 to 8. The number of signal outputs increases as M and/or N increases. In yet another embodiment of the invention, each detector module 50 may be coupled to a plurality of converter cards.

Figure 5:
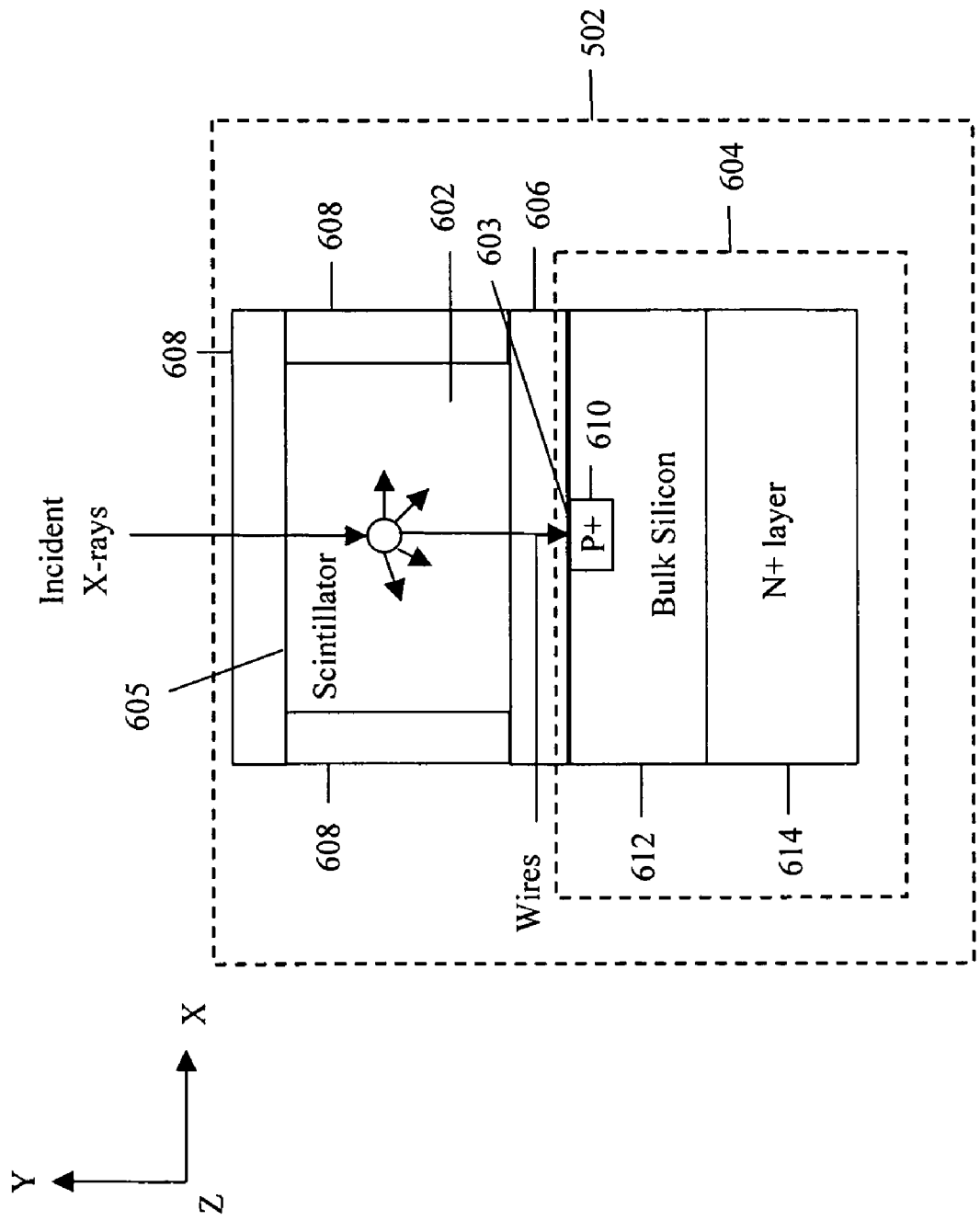
FIG. 5 is a side view illustrating a detector element, in accordance with an embodiment of the invention.
Figure 6:
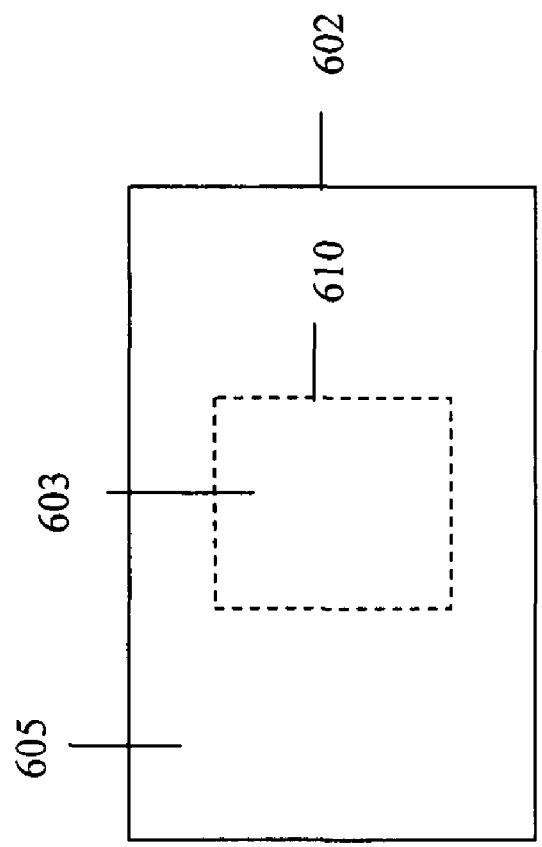
FIG. 6 is a top view illustrating the detector element of FIG. 5.
Figure 6:
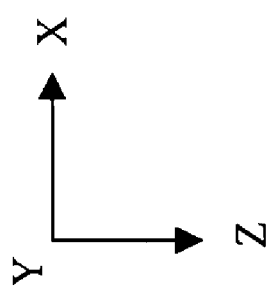

FIGS. 5 and 6 are diagrams illustrating a detector element 502, in accordance with an embodiment of the invention. Detector element 502 is an example of detector element 20. Detector element 502 includes a scintillator cell or scintillator 602, a photodiode 604, an optical coupling 606, and a plurality of reflectors 608. Photodiode 604 includes a photosensitive region 610, a layer of bulk silicon 612, and an n$^+$layer 614. Scintillator cell 602 is optically coupled to photodiode 604 through optical coupling 606. In an embodiment of the invention, optical coupling 606 may be composed of optical fibers.

As used herein, 'formed' includes processes to fabricate each detector element 502. The processes include at least one of, but are limited to, etching, patterning, and depositing. The n+ layer 614 of scintillator cell 602 is formed on a substrate (not shown). Bulk silicon 612 is formed on n+ layer 614. Photosensitive region 610 is formed on bulk silicon 612. Photosensitive region 610 may be formed by depositing a doping material in bulk silicon 612. Optical coupling 606 is deposited on bulk silicon 612 and on photosensitive region 610. Scintillator cell 602 and reflectors 608 are formed on optical coupling 606. Reflector 608 is formed on scintillator cell 602.

In an embodiment of the invention, x-rays, after passing through subject 22, fall on scintillator cell 602. Scintillator cell 602 absorbs these x-rays and emits visible light that is proportionate to the intensity of the x-rays absorbed. Reflectors 608 increase an amount of visible light absorbed by photodiode 604.

The visible light emitted by scintillator cell 602 is absorbed by photosensitive region 610 of photodiode 604. Photodiode 604 then generates an electrical signal that is proportionate to the intensity of the visible light falling on photosensitive region 610. This electrical signal generated by photodiode 604 is representative of the attenuation of the x-rays falling on the corresponding scintillator cell 602. The electrical signal is carried from photosensitive region 610 via flexible electrical cable 68 to DAS 32.

In various embodiments of the invention, photosensitive region 610 has an area that is less than half an area of scintillator cell 602. For example, an area of a surface 603 of photosensitive region 610 is less than half an area of a surface 605 of scintillator cell 603. Surfaces 603 and 605 face x-ray source 14. Moreover, surface 603 is adjacent to optical coupling 606 and surface 605 is adjacent to reflector 608. As another example, if detector array 18 is planar and lies in an xz plane, an area of surface 603 measured in the xz plane is less than half an area, measured in the xz plane, of surface 605. The xz plane is formed by the x-axis and the z-axis. In an embodiment of the invention, the area of photosensitive region 610 ranges from ⅕ to half of the area of scintillator cell 602.

The electrical signals generated by photodiode 604 depend on the amount of x-rays absorbed by scintillator cell 602. Photodiode 604, with area of photosensitive region 610 less than half of the area of scintillator cell 602, generates low level electrical signals having a low noise. Further, photosensitive region 610 has a lower capacitance than a capacitance of a photodiode having an area of a photosensitive region equal to an area of a scintillator cell. The lower capacitance of photosensitive region 610 results in a lower noise in the electrical signals generated by photodiode 604 when photodiode 604 is electrically connected to a DAS channel than a noise generated by the photosensitive region of the photodiode having an area of the photosensitive region equal to an area of a scintillator cell electrically connected to a DAS channel. Therefore, detector element 502, with area of photosensitive region 610 less than half of the area of scintillator cell 602, generates a low-noise electrical signal. This facilitates the use of low-noise DAS chips with detector 502. Therefore, the electronic noise being added by a system including the DAS chips and detector element 20 is low, resulting in an overall improved signal-to-noise electrical signal, thereby providing better image quality of the reconstructed image.

In various embodiments of the invention, photosensitive region 610 may be a p region or an n region. In various embodiments of the invention, photosensitive region 610 acts as an anode of photodiode 604 and n$^+$layer 614 acts as a cathode. Photodiode 604 is mounted on the substrate connected to flexible electrical cable 68. The substrate may be a 'p-type' semiconductor so that photodiode 604 forms a p-n-p structure.

Figure 7:
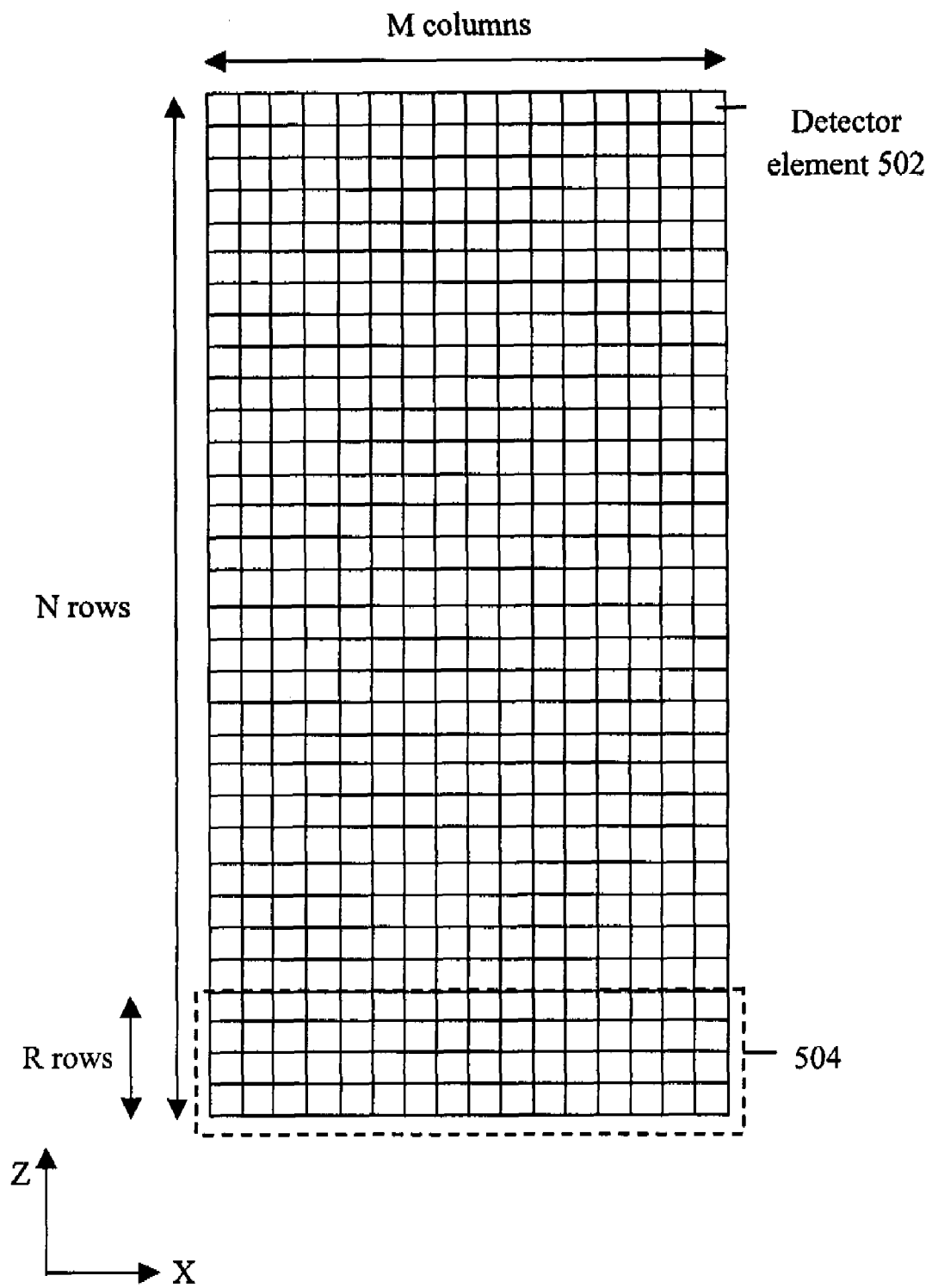
FIG. 7 is a top view illustrating a detector module, in accordance with an embodiment of the invention.

FIG. 7 is a diagram illustrating a detector module 404, in accordance with an embodiment of the invention. Detector module 404 is an example of detector module 50. Detector module 404 includes an M X N array of detector elements 502, with M detector elements 502 along the x-axis and N detector elements 502 along the z-axis. An example of M is 16 and N is 32. Another example of M is 100 and N is 100. Yet another example of M is 16 and N is 16. Detector element 502 is an example of detector element 20. An exemplary area of each detector element 502 may be 1 mm by 1 mm in the xz plane. Another exemplary area of detector element 502 may be 0.9 mm×0.9 mm in the xz plane. Another exemplary area of detector element 502 is 0.625 mm at the isocenter.

In an embodiment of the invention, the electrical signals generated by N rows of detector elements 502 along the z-axis may be combined by using the decoder 62 and switch apparatus 60 to form Q slices, such as slice 504. This is done by combining the electrical signals generated by adjacent R rows of detector elements 502, to generate a single signal output per slice. Therefore, each slice has a thickness of R×S mm because the electrical signals generated by R rows of detector elements 502 are combined, where each row of detector elements 502 is S mm thick. The slice resolution is R×S mm. As an example, the electrical signals generated by 24 rows of detector elements 502 along the z-axis may be combined to form eight slices 504. This is done by combining the electrical signals generated by three adjacent rows of detector elements 502. Therefore, each slice has a thickness of 3 mm. As yet another example, the electrical signals generated by 16 rows of detector elements 502 along the z-axis may be combined to form eight slices 504, each slice having a thickness of 2 mm.

Similarly, as another example, the electrical signals generated by eight rows of detector elements 502 along the z-axis may be combined to form eight slices 504, each slice having a thickness of 1 mm. As still another example, the electrical signals generated by 32 rows of detector elements 502 along the z-axis may be combined to form 16 slices 504, each slice having a thickness of 2 mm. As another example, the electrical signals generated by the center 16 rows of detector elements 502 along the z-axis may be combined to form 16 slices 504, each slice having a thickness of 1 mm. As yet another example, the electrical signals generated by 32 rows of detector elements 502 along the z-axis may form 32 slices, each slice having a thickness of 1 mm. As still another example, the electrical signals generated by various rows of detector elements 502 may be combined along the z-axis to form less than eight slices.

Slices formed by combining electrical signals from a plurality of rows of detector elements along the z-axis may not be of uniform thickness. For example, the electrical signals generated by first eight rows of detector elements 502 may be combined to form one slice, the electrical signals generated by the center 16 rows of detector elements 502 may be combined to form a second slice, and finally the electrical signals generated by the remaining eight detector elements 502 may be combined to form a third slice. Therefore, such a system configuration has three slices of varying thicknesses, i.e., 8 mm and 16 mm.

In another embodiment of the invention, the electrical signals generated by detector elements 502 along the x-axis in a slice may also be combined to further reduce the number of signal outputs from each slice. In another alternative embodiment, the electrical signals generated by detector elements 502 along the x-axis may be combined and the electrical signals generated by detector elements 502 along the z-axis may be combined to further reduce the number of signal outputs from each slice.

Various embodiments of the invention provide a detector with a low-noise signal output for an x-ray imaging system. Specifically, various embodiments of the invention provide a detector including a photosensitive region with an area less than half of the area of the scintillator cell from which the photosensitive region receives light. Such a detector has a lower capacitance, and hence, results in a low-noise electrical signal, thereby facilitating the use of low-noise and low-cost DAS chips. This reduces the overall noise in the x-ray imaging system. Reducing the noise improves the quality of the image obtained from the x-ray imaging system.

A technical effect of the various embodiments of the invention is to produce a low-noise signal output by the detector in an x-ray imaging system. Other technical effects include developing a low-noise system by connecting a low-noise and a low-cost DAS with a low-noise detector.

While the invention has been described in terms of various specific embodiments, those skilled in the art will recognize that it can be practiced with modifications within the spirit and scope of the claims.

What is claimed is:

1. A detector comprising:
a scintillator array comprising a plurality of scintillators, each of said scintillators comprising an outlet surface having an outlet surface area; and
a photodiode array optically coupled to said scintillator array, said photodiode array comprising a plurality of photodiodes that each comprises a photosensitive surface configured to receive visible light from only one of said scintillators, wherein said photosensitive surface faces said outlet surface of said one of said scintillators and has a photosensitive surface area that is less than about one-third of the outlet surface area of said one of said scintillators.

2. A detector in accordance with claim 1 wherein the photosensitive surface area ranges from one-fiftieth of the outlet surface area to one-fourth of the outlet surface area.

3. A detector in accordance with claim 1 wherein said photosensitive surface comprises either an n region or a p region.

4. A detector in accordance with claim 1 wherein the outlet surface area is approximately 1 millimeter×1 millimeter.

5. A detector in accordance with claim 1 further comprising a detector module comprising said photodiode array and said scintillator array, wherein said detector module is coupled to a data acquisition system via a transistor array configured to generate a combined signal from a plurality of detector elements of said detector module.

6. A detector in accordance with claim 1 further comprising a detector module comprising said photodiode array and said scintillator array, wherein said detector module is coupled to a data acquisition system comprising a converter card comprising a plurality of electronic circuits, each electronic circuit configured to receive a signal from a detector element of said detector module.

7. A detector in accordance with claim 1 further comprising a detector module comprising said photodiode array and said scintillator array, wherein said detector module is coupled to a data acquisition system comprising a converter card comprising a plurality of electronic circuits, each electronic circuit configured to receive a combined signal generated from a plurality of detector modules, and each electronic circuit comprises a pre-amplifier and a digital-to-analog converter.

8. A detector in accordance with claim 1 further comprising a detector module comprising said photodiode array and said scintillator array, wherein said detector module is coupled to a data acquisition system comprising a converter card comprising a plurality of electronic circuits, and each electronic circuit comprises a pre-amplifier and a digital-to-analog converter.

9. A detector in accordance with claim 1 further comprising a detector module comprising said photodiode array and said scintillator array, wherein said detector module is coupled to a data acquisition system comprising a number of converter cards, the number of converter cards are based on a number of detector elements of the detector module that are combined in one of an x-direction and a z-direction, and the number of converter cards decrease upon increasing the number of detector elements that are combined.

10. An x-ray imaging system comprising:
an x-ray source configured to generate x-rays; and
an x-ray detector module configured to detect the x-rays, wherein said x-ray detector module comprises a scintillator array and a photodiode array optically coupled to said scintillator array, said scintillator array comprising a plurality of scintillators that each comprises an outlet surface having an outlet surface area, said photodiode array comprising a plurality of photodiodes that each comprises a photosensitive surface configured to receive visible light from only one of said scintillators, wherein said photosensitive surface faces said outlet surface of said one of said scintillators and has a photosensitive surface area that is less than about one-third of the outlet surface area.

11. An x-ray imaging system in accordance with claim 10 wherein the photosensitive surface area ranges from one-fiftieth of the outlet surface area to one-fourth of the outlet surface area.

12. An x-ray imaging system in accordance with claim 10 wherein said photosensitive surface comprises either an n region or a p region.

13. An x-ray imaging system in accordance with claim 10 wherein the outlet surface area is approximately 1 millimeter×1 millimeter.

14. An x-ray imaging system in accordance with claim 10 further comprising a data acquisition system coupled to said x-ray detector module.

15. An x-ray imaging system in accordance with claim 10 further comprising a data acquisition system coupled to said x-ray detector module, wherein said data acquisition system comprises a number of converter cards, and the number of converter cards are based on a number of detector elements of the detector module that are combined.

16. A computed tomography imaging system comprising:
an x-ray source configured to generate x-rays;
an x-ray detector module configured to detect the x-rays, wherein said x-ray detector module comprises a scintillator array and a photodiode array optically coupled to said scintillator array, said scintillator array comprising a plurality of scintillators that each comprises an outlet surface having an outlet surface area, said photodiode array comprising a plurality of photodiodes that each comprises a photosensitive surface configured to receive visible light from only one of said scintillators, wherein said photosensitive surface faces said outlet surface of said one of said scintillators and has a photosensitive surface area that is less than about one-third of the outlet surface area; and
an image reconstructor configured to reconstruct an image from information generated from the x-rays.

17. A computed tomography imaging system in accordance with claim 16 wherein the photosensitive surface area ranges from one-fiftieth of the outlet surface area to one-fourth of the outlet surface area.

18. A computed tomography imaging system in accordance with claim 16 wherein said photosensitive surface comprises either an n region or a p region.

19. A computed tomography imaging system in accordance with claim 16 wherein the outlet surface area is approximately 1 millimeter×1 millimeter.

20. A computed tomography imaging system in accordance with claim 16 further comprising a data acquisition system coupled to said x-ray detector module.

* * * * *